US012719762B2

(12) United States Patent
Savalle et al.

(10) Patent No.: US 12,719,762 B2
(45) Date of Patent: Aug. 25, 2026

(54) CITING SOURCES FROM USER INTERFACE VIEWS IN LLM-BASED NETWORK AGENTS

(71) Applicant: Cisco Technology, Inc., San Jose, CA (US)

(72) Inventors: Pierre-André Savalle, Rueil-Malmaison (FR); Jean-Philippe Vasseur, Combloux (FR); Eduard Schornig, Haarlem (NL); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/386,809

(22) Filed: Nov. 3, 2023

(65) Prior Publication Data

US 2025/0150356 A1 May 8, 2025

(51) Int. Cl.
*H04L 41/16* (2022.01)
*H04L 41/22* (2022.01)

(52) U.S. Cl.
CPC .............. *H04L 41/16* (2013.01); *H04L 41/22* (2013.01)

(58) Field of Classification Search
CPC ................................ H04L 41/16; H04L 41/22
See application file for complete search history.

(56) References Cited

U.S. PATENT DOCUMENTS 12,126,643 B1 * 10/2024 Skarphedinsson .......................... H04L 63/1441
2010/0180082 A1 * 7/2010 Sebastian .............. H04L 67/568 711/E12.017
2015/0363493 A1 12/2015 Laredo et al.
2019/0213057 A1 7/2019 Nitta
2020/0372088 A1 11/2020 Liu et al.
2023/0259705 A1 8/2023 Tunstall-Pedoe et al.
2023/0376847 A1 * 11/2023 Travalini ............... G06N 3/088
2024/0070434 A1 * 2/2024 Garg .................... G06N 3/0455
2024/0095400 A1 * 3/2024 Poe ...................... G06F 11/0766
2024/0104002 A1 * 3/2024 Kumar ................ G06F 11/3664
2024/0121636 A1 * 4/2024 Wang ....................... H04L 41/16
2024/0177172 A1 * 5/2024 Ghoche ............ G06Q 10/06316
2024/0403420 A1 * 12/2024 Lal ......................... G06F 21/566
2024/0411752 A1 * 12/2024 Prabhakar ............. H04L 9/0825
2025/0005057 A1 * 1/2025 Khosla .................... G06F 40/40
2025/0244964 A1 * 7/2025 Mystetskyi ............... G06F 8/65

OTHER PUBLICATIONS

Crammer K., et al., "Online Passive-Aggressive Algorithms", Journal of Machine Learning Research, vol. 7, 2006, pp. 551-585.
Liu Z., et al., "Dynamic LLM-Agent Network: An LLM-Agent Collaboration Framework with Agent Team Optimization", Department of Computer Science Technology, arXiv:2310.02170v1 [cs. CL], Oct. 3, 2023, pp. 1-21.

* cited by examiner

*Primary Examiner* — Chris Parry
*Assistant Examiner* — Steven C Nguyen
(74) *Attorney, Agent, or Firm* — Lee & Hayes, P.C.

(57) ABSTRACT

In one implementation, a device receives a prompt for input to a large language model of a troubleshooting agent for a computer network. The device generates, using the troubleshooting agent, an intermediate answer by inputting the prompt to the large language model. The device identifies a hyperlink to a view associated with the intermediate answer and provided by an online application associated with administration of the computer network. The device provides the hyperlink in conjunction with the intermediate answer for display.

19 Claims, 8 Drawing Sheets

CITING SOURCES FROM USER INTERFACE VIEWS IN LLM-BASED NETWORK AGENTS

TECHNICAL FIELD

The present disclosure relates generally to citing sources from user interface views in large language model (LLM)-based network agents.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers.

In addition, constructing a user-facing utility for an LLM-based network agent can also be challenging. Indeed, an agent flow to answer a question may require multiple steps, each of which individually can take some time. Consequently, there may be a noticeable delay in returning an answer to the original question (e.g., on the order of minutes), which can be frustrating to users. Further, LLMs can also make mistakes which may not be apparent to a user. For example, consider the case of a model that can generate code to make an API call to list network devices, but generates an incorrect filter argument. As a result, the system may return an empty result set to the user, leading the user to believe that there were no matches to their desired criteria, when the empty results were due to the LLM using the wrong argument.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
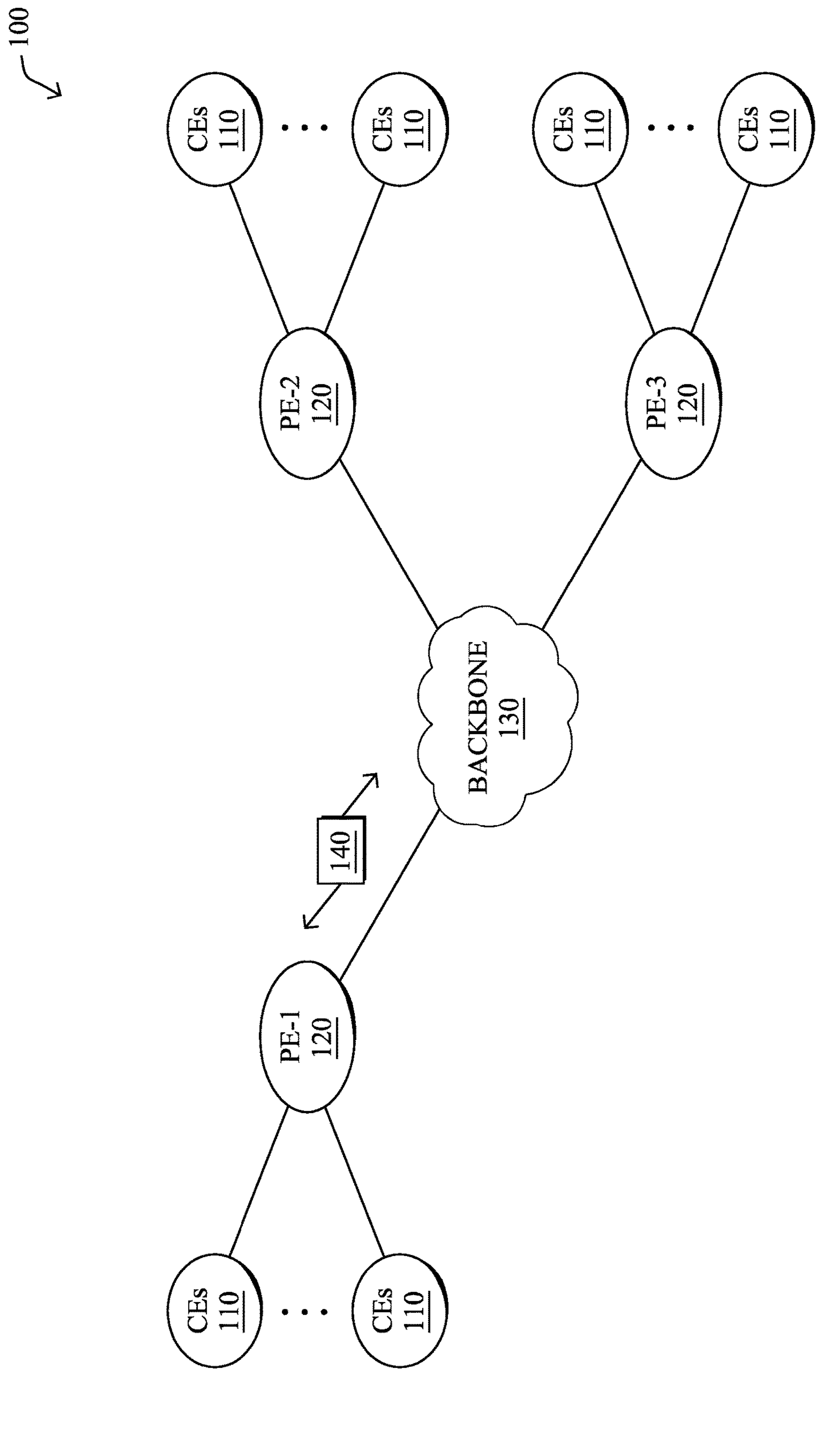
FIGS. 1A-1B illustrate an example communication network.

According to one or more implementations of the disclosure, a device receives a prompt for input to a large language model of a troubleshooting agent for a computer network. The device generates, using the troubleshooting agent, an intermediate answer by inputting the prompt to the large language model. The device identifies a hyperlink to a view associated with the intermediate answer and provided by an online application associated with administration of the computer network. The device provides the hyperlink in conjunction with the intermediate answer for display.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
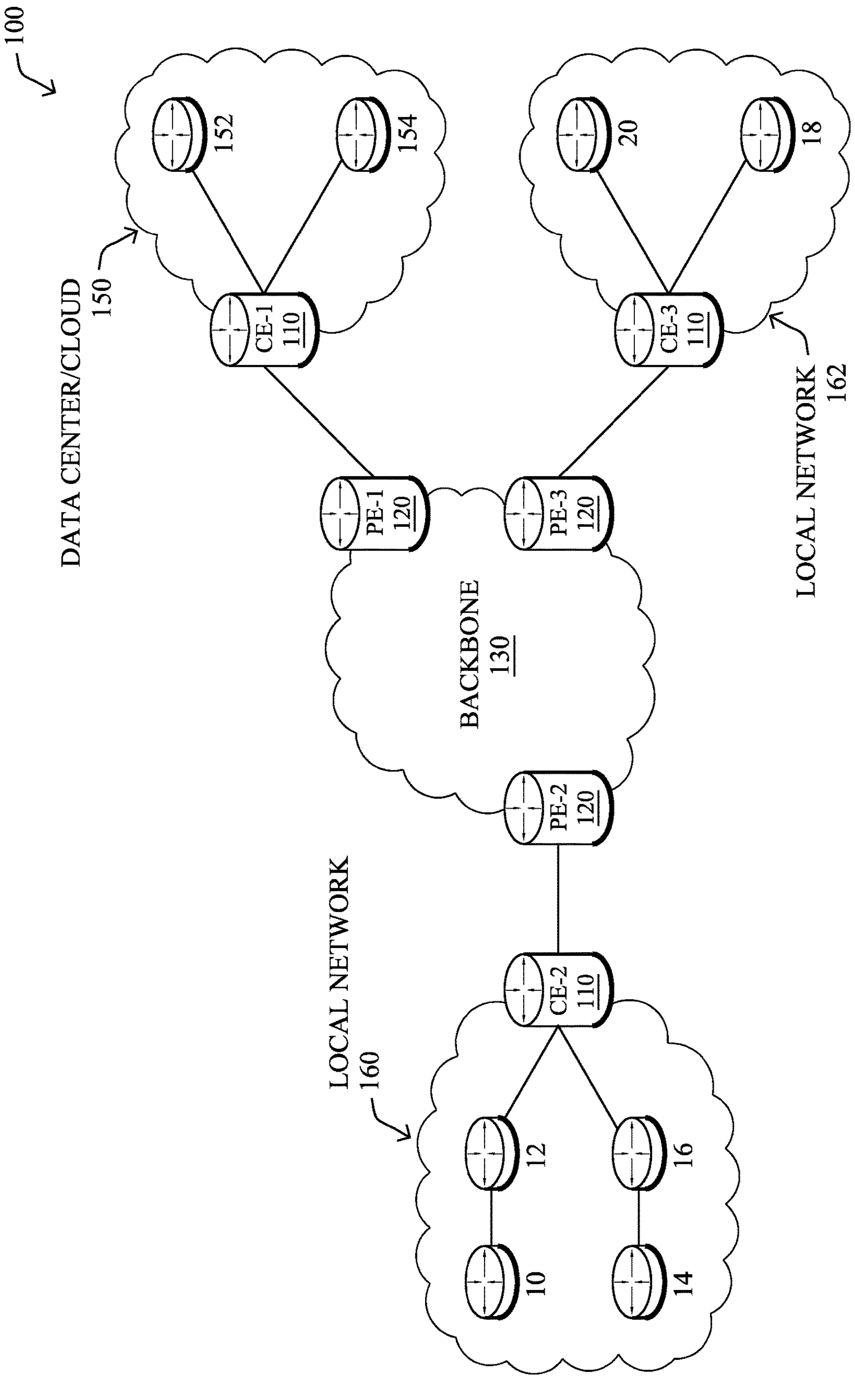

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
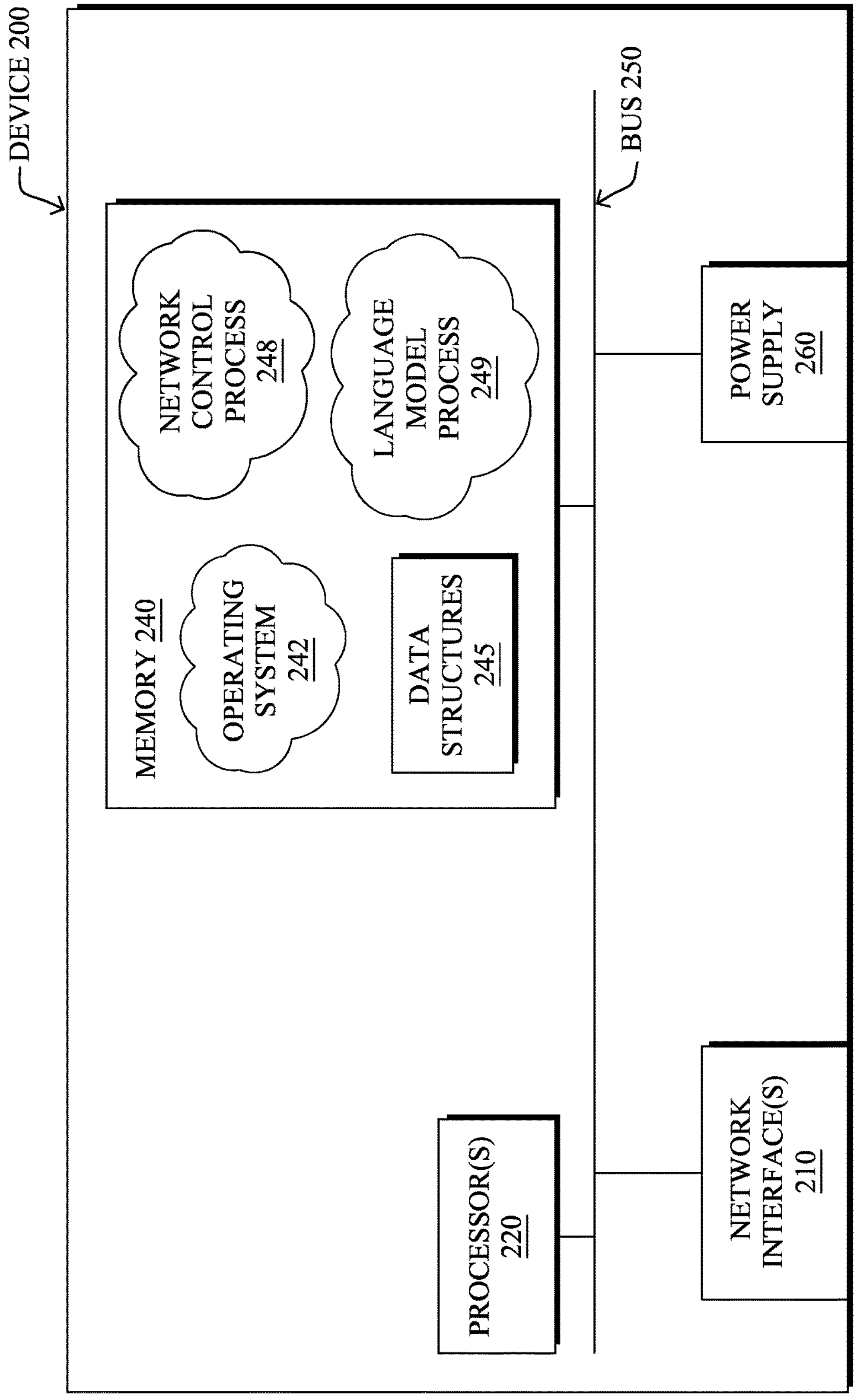
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
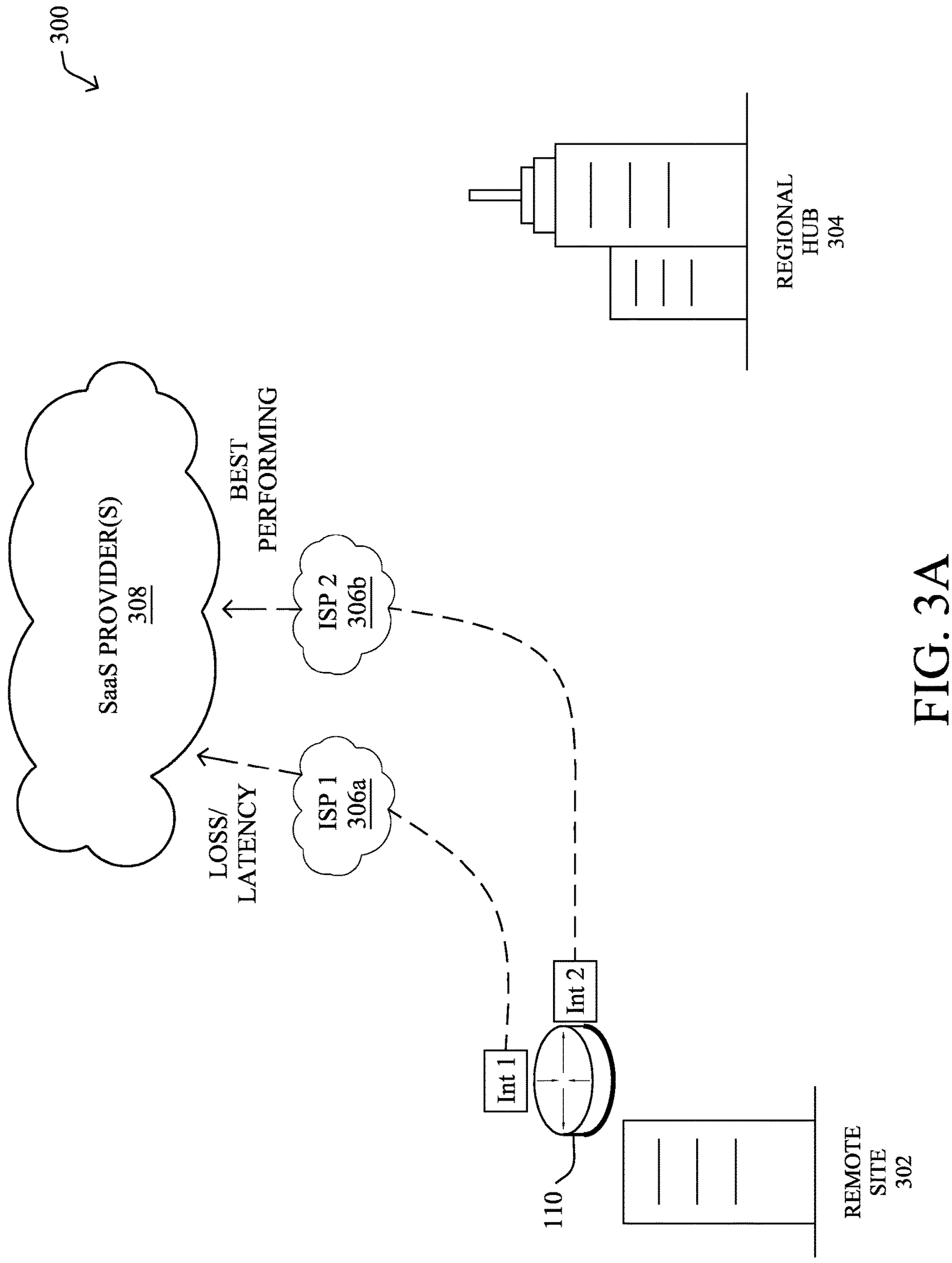
FIGS. 3A-3B illustrate example network deployments.
Figure 3B:
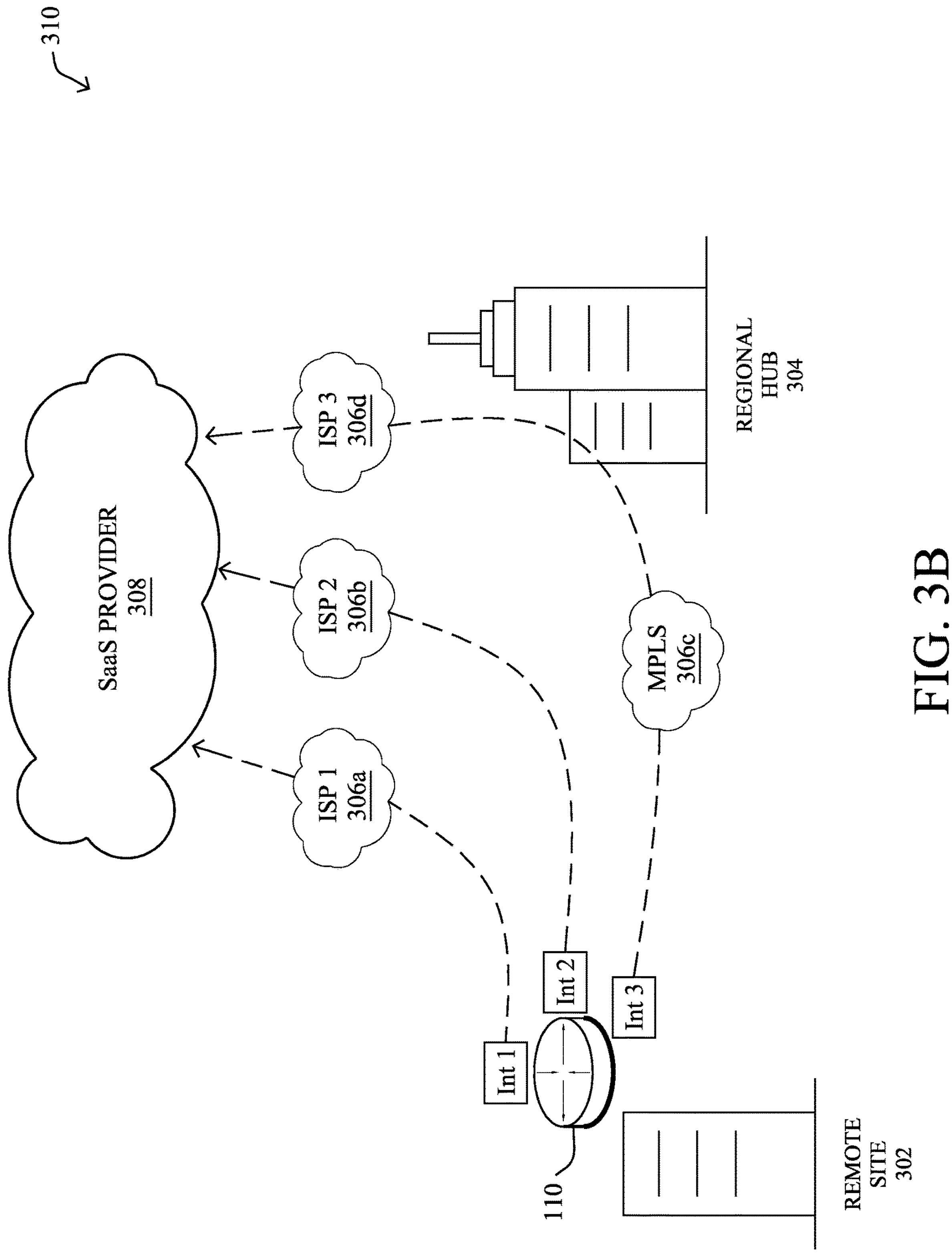

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
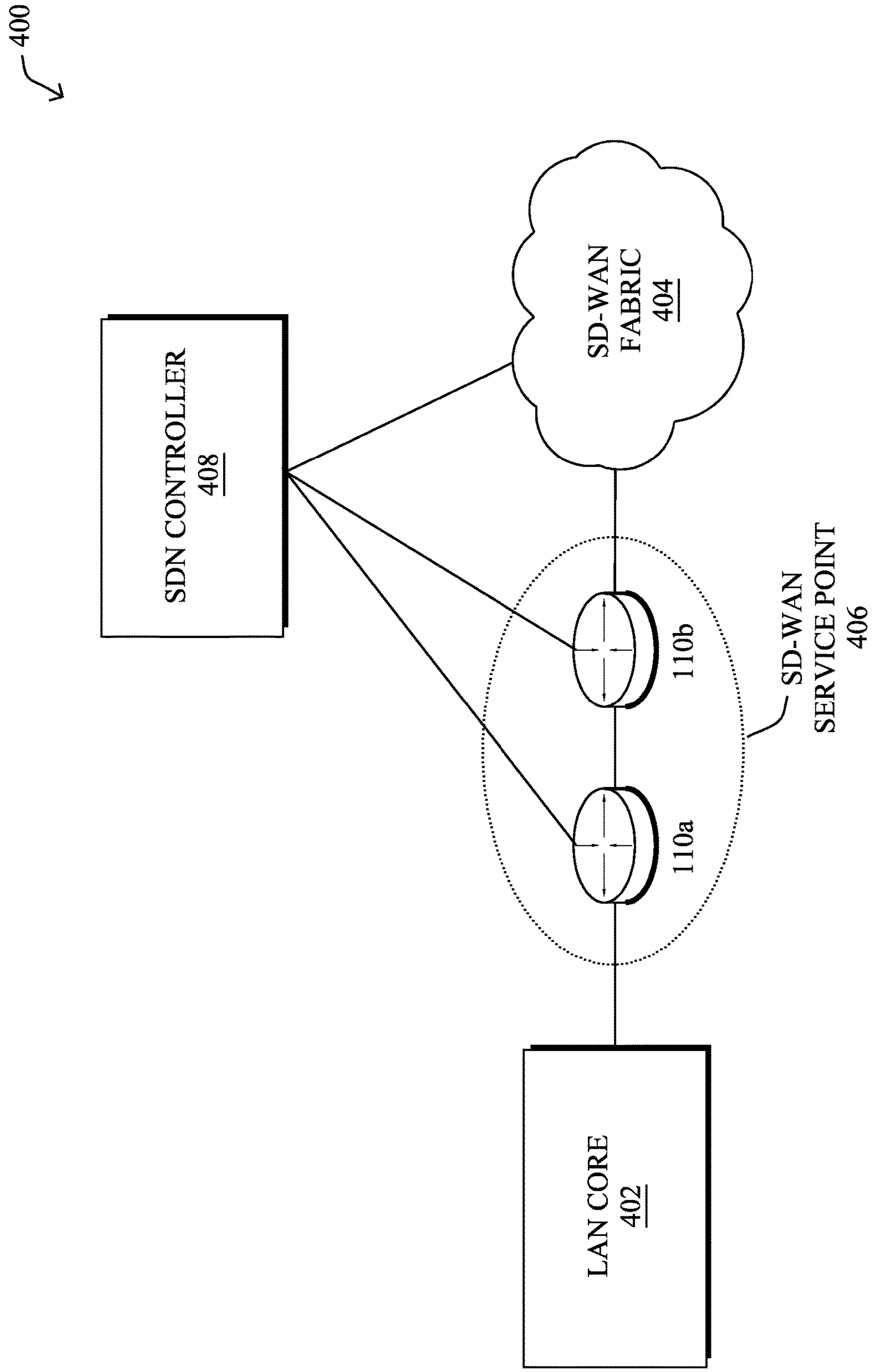
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently. the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;
- Internet, MPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

However, building a user-facing product from an LLM-based agent can be difficult for reasons such as the following:

- An agent flow to answer a question may require multiple steps, each of which can take some time, individually. Consequently, the system may take a noticeable amount of time to provide an answer to the original question (e.g., on the order of minutes), which can be frustrating to users.
- LLMs can make mistakes which may not be apparent to a user. For example, consider the case of an LLM that can generate code that calls an API to list network devices but somehow provides an incorrect filter argument to the API. When the API returns an empty result set, a user may interpret this result as meaning that no devices match their desired criteria while, in fact, the system simply called the API incorrectly. These issues can be hard to avoid due to the opaque and non-deterministic nature of LLMs, and users may quickly lose confidence in the system when faced with such issues.
- Although LLMs can provide an alternative user experience by allowing a user to ask questions about a system using natural language, users often have years of familiarity with traditional web or application user interfaces. A chat bot can feel like a disconnected experience from those user interfaces, which can also be frustrating to users.

Citing Sources from User Interface Views in LLM-based Network Agents

The techniques introduced herein allow an LLM-based system to provide intermediary explanations and progress by automatically identifying hyperlinks to a user interface. This allows a user of the system to gain more confidence in the agent's capabilities and easily expand the search while remaining in a familiar environment. For instance, consider an agent connected to the APIs of a network controller faced with an input question of "how many users are connected the same access point as Chiara?" The proposed techniques may then provide intermediary feedback to the user during execution of the agent such as the following:

I am checking which access point Chiara is connected to.

Chiara is connected to access point MUC-HQ-11-AP01. See User information for Chiara in the Cisco DNA Center user interface (UI). Next, I'll check how many users are connected to this access point. The hyperlink would directly take the user to the Cisco DNA Center Client 360 for Chiara, which will have confirmation of the network device that Chiara is currently connected to, as well as allow the user to check out other details. In some cases, a controller UI widget can be directly embedded in the chat workflow to provide an even tighter integration.

There are three users currently connected to MUC-HQ-11-AP01. See Device Details in the Cisco DNA Center UI. Similarly, the hyperlink would take the user to the device details in Cisco DNA Center, allowing the user to double check the answer as well as to expand the investigation from there on.

This is a simplistic example, but more complex callouts can be provided for more difficult questions. In addition, even this simplistic example is non-trivial for an agent to handle. An agent would usually be designed to write code to call out to APIs to answer questions. However, providing information to the user about API calls can be confusing, as users are usually familiar with the application UIs and not necessarily the APIs. The agent needs to be able to reliably provide information about matching UI elements and views corresponding to the API methods it is using (e.g., being able to build URLs to the web UI with correct routing information to select the right entities or filter tables in the right way), which is difficult.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device receives a prompt for input to a large language model of a troubleshooting agent for a computer network. The device generates, using the troubleshooting agent, an intermediate answer by inputting the prompt to the large language model. The device identifies a hyperlink to a view associated with the intermediate answer and provided by an online application associated with administration of the computer network. The device provides the hyperlink in conjunction with the intermediate answer for display.

Figure 5:
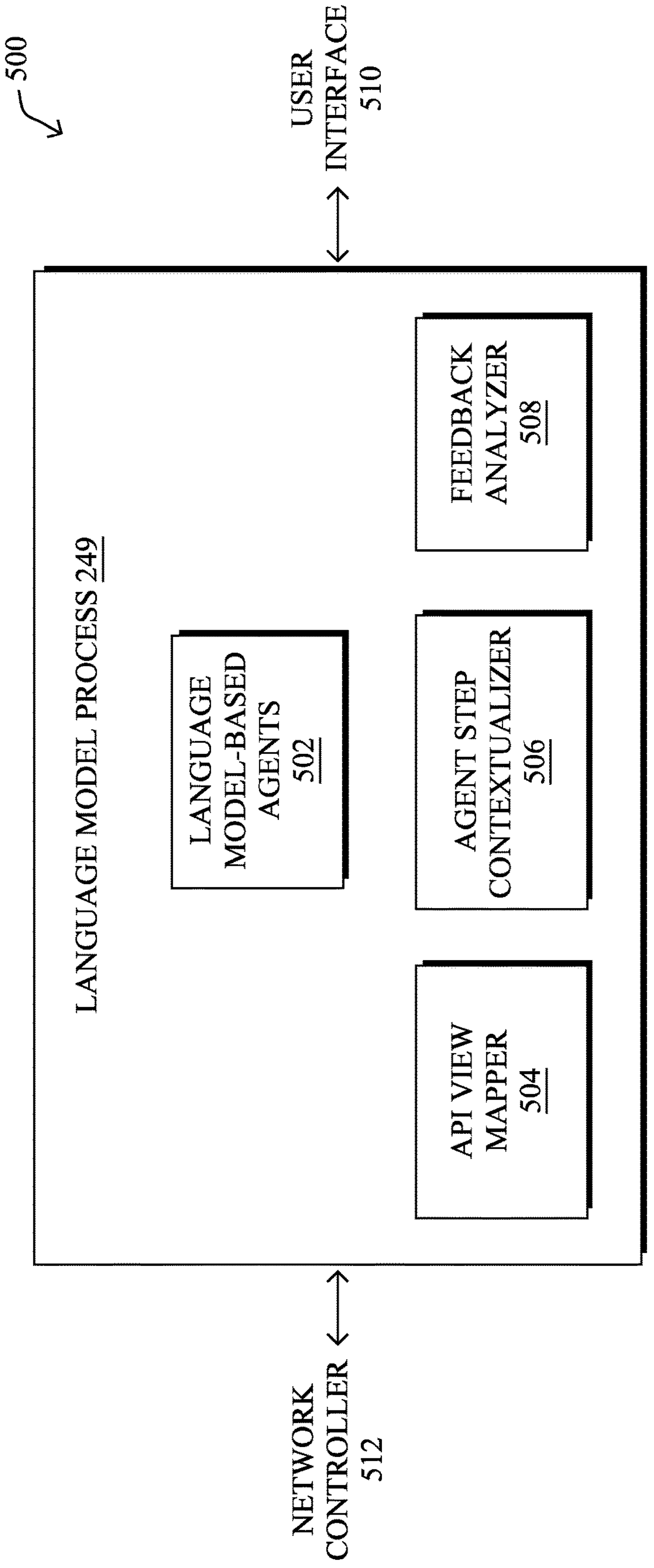
FIG. 5 illustrates an example architecture for citing sources from user interface views in large language model (LLM)-based network agents.

Operationally, FIG. 5 illustrates an example architecture 500 for citing sources from user interface views in LLM-based network agents, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 512, either locally or via a network, such as via one or more application programming interfaces (APIs), etc.

As shown, language model process 249 may include any or all of the following components: one or more language model-based agents 502, an API view mapper 504, an agent step contextualizer 506, and/or a feedback analyzer 508. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

During execution, the one or more language model-based agents 502 may leverage one or more language models, such as one or more LLMs, to answer a question issued by a user via a user interface 510. More specifically, in response to receiving an input query from user interface 510, the one or more language model-based agents 502 may perform one or more steps that can consist in calling an LLM or retrieve data from external systems, and produces an answer as output. In particular, the agent may rely on external APIs to obtain data required to answer the questions, such as one or more APIs of network controller 512, in the case of the agent being used for networking operations. To do so, the agent may ask the LLM to write code to call the API(s) either directly invoke the API (using a Python HTTP client library) or by using software development kit (SDK) packages.

During execution, API view mapper 504 may attempt to map API endpoints on the remote systems (e.g., network controller 512, etc.) to views in a corresponding user interface (UI). In the following description, a single API endpoint corresponding to a single system with a unique user-facing user interface is used for simplicity, although the techniques can easily be extended to multiple such systems, as well. For example, in the case of network monitoring and control, the user interface may be provided by a network monitoring and control application.

In a first implementation, API view mapper 504 may rely on the user interface being instrumented with Real User Monitoring (RUM) using an application performance monitoring (APM) platform or some form of session-replay capability, which tracks interactions made by users with the user interface (such as clicking, selecting, panning in and out, etc.) as well as all resulting API requests. These capabilities are commonly used to monitor performance, to improve user workflows, or to debug client-side issues, and can be provided by vendors such as AppDynamics, Datadog, etc. A simplified representation of the data from RUM consists in a sequence of user actions and API requests. Modern web applications often materialize actions explicitly in their uniform resource locator (URL), as well, updating the URL to reflect the action: either by browsing to a different URL, or only virtually as in the case of single page application (SPA) routing. This allows users to use the previous/next buttons in their browser as they would expect, as well as to share the direct link to any precise view in an application.

For example:

Action:

Clicked on row with ID "jdoe" in UI table with DOM id "users"

URL changed from:/ui/#users/to/ui/#users/jdoe

Request: GET/users/jdoe/details
Action: . . .
Request: . . .

In a second implementation, assuming that RUM data is not available to API view mapper 504, API view mapper 504 may generate similar data offline by using a headless or automation-enabled browser to crawl the user interface. To do so, API view mapper 504 may include an automation engine configured to browse to the home page of the user interface/application, clicking or selecting things that can be selected. The engine may use random sampling to decide where to go next (e.g., with probabilities inversely proportional to whether it has sampled neighboring document object model (DOM) elements before, to encourage exploration of new views). This can be used to generate similar data as in the APM/RUM example above.

Using APM or APM-like data, API view mapper 504 may generate a mapping from an API path to URLs of corresponding UI views. In turn, API view mapper 504 may proceed as follows:

For each API path and UI path in the APM data, identify static tokens and dynamic tokens. For example, in/users/jdoe/details, jdoe is a dynamic token. Similarly, in/ui/#users/jdoe, jdoe is a dynamic token. This can be done using classical techniques (e.g., database techniques to infer parameterized queries based on queries with scalar parameter values).

For each API and UI path, replace dynamic tokens with placeholders, such as /users/$1/details and /ui/#users/$1, where $1 is a placeholder for the username.

For each generic API path, build the list of all distinct generic UI paths, along with statistics about their occurrences. Using heuristics, narrow down the list to only one or a couple UI views.

API view mapper 504 then produces a mapping from a generic API path (e.g., /users/$1/details) to a generic UI path (e.g., /ui/#users/$1) with shared placeholder variables.

In various implementations, agent step contextualizer 506 may be responsible for taking a step from the main agent (e.g., an agent from the one or more language model-based agents 502) and putting it in context by providing a link to one or more related UI views, as well as a natural language explanation. After each step from the main agent (i.e., a successful planning step or an observation has been produced), agent step contextualizer 506 may initiate an asynchronous process (so as not to block or delay the rest of the processing of the agent) to try and explain the step.

In one implementation, agent step contextualizer 506 may call another LLM with the last input/output from the main agent, asking that LLM to summarize the step. The prompt can also be tuned to achieve the right persona and writing style, in some cases.

In another implementation, the main agent can be directly tasked to always provide a summary of the step it is about to execute, to avoid the need to produce that explanation separately. This allows to speed up the explanation process significantly and avoid any non-determinism.

In addition to a natural language explanation, agent step contextualizer 506 may also extract the API calls made by the agent and identify the corresponding UI views using the mapping from API view mapper 504. If there are multiple matches, agent step contextualizer 506 may use weights to prioritize the UI views and select only one or a few top views. In some instances, agent step contextualizer 506 may build a list of hyperlinks to the corresponding UIs by substituting concrete value for the placeholders.

Agent step contextualizer 506 may then format the natural language explanation and hyperlinks, to send them back to the user directly while the main agent proceeds with the next step. The intermediary feedback can also be augmented with a mechanism to collect user feedback on that step (e.g., binary feedback capturing whether the explanation was both helpful and accurate), in some instances.

In various implementations, feedback analyzer 508 may be responsible for processing user feedback provided on intermediary step explanations and tuning the retrieval weights of the UI views. For example, some API calls may not be interesting to report to the user, even if they are also associated to UI views, and feedback analyzer 508 can learn to hide those completely to focus on more interesting views. In some cases, feedback analyzer 508 may use an online learning algorithm to boost or decrease weights, as needed, such as online passive aggressive algorithms.

As would be appreciated, while examples are given herein in the context of answering network troubleshooting questions, the techniques herein are not limited as such and are applicable across a wide variety of domains.

Figure 6:
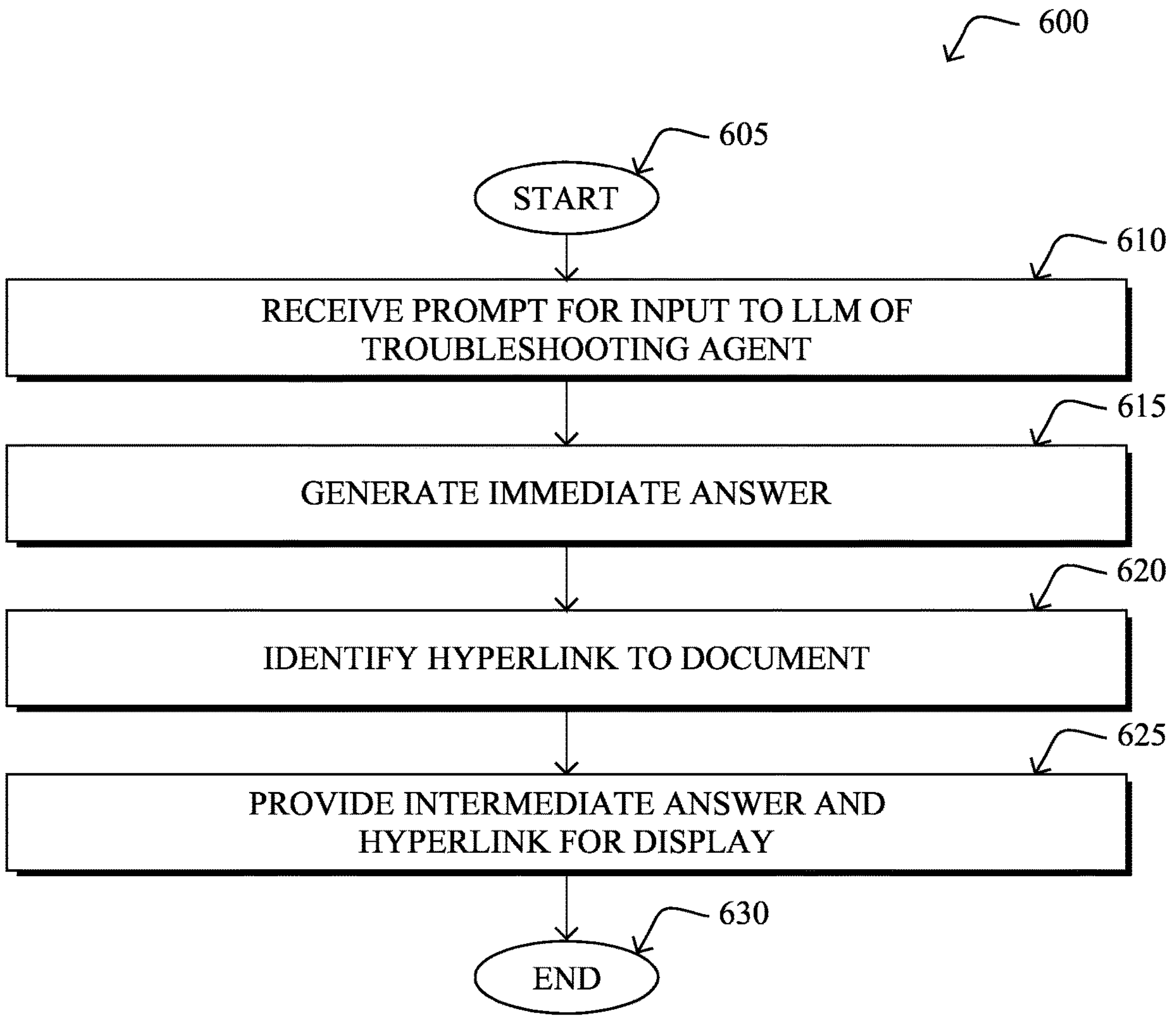
FIG. 6 illustrates an example simplified procedure for citing sources from user interface views in LLM-based network agents.

FIG. 6 illustrates an example simplified procedure 600 (e.g., a method) for citing sources from user interface views in large language model (LLM)-based network agents, in accordance with one or more implementations described herein. For example, a non-generic, specifically configured device (e.g., device 200), such as a router, firewall, controller for a network (e.g., an SDN controller or other device in communication therewith), server, or the like, may perform procedure 600 by executing stored instructions (e.g., language model process 249 and/or network control process 248). The procedure 600 may start at step 605, and continues to step 610, where, as described in greater detail above, the device may receive a prompt for input to a large language model of a troubleshooting agent for a computer network.

At step 615, as detailed above, the device may generate, using the troubleshooting agent, an intermediate answer by inputting the prompt to the large language model. In some implementations, the large language model generates the intermediate answer based in part on the view. In various implementations, the intermediate answer includes information about a user or node in the computer network indicated by the prompt. In one implementation, the device may generate the intermediate answer in part by using a second large language model to summarize a step that the large language model of the troubleshooting agent performs in response to input of the prompt.

At step 620, the device may identify a hyperlink to a view associated with the intermediate answer and provided by an online application associated with administration of the computer network, as described in greater detail above. In some cases, the device may do so by automatically crawling views of the online application. In further implementations, the device may do so by instrumenting the online application.

At step 625, as detailed above, the device may provide the hyperlink in conjunction with the intermediate answer for display. In some cases, the view is associated with an application programming call of the online application. In some implementations, the device may also obtain feedback from a user regarding whether that user believed the view was relevant to the intermediate answer. In turn, the device may also, based on the feedback, suppress the hyperlink from being provided in conjunction with further intermediate answers by the troubleshooting agent. The device may also provide a final answer generated by the troubleshooting agent for display.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for citing sources from user interface views in large language model (LLM)-based network agents, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

receiving, at a device, a prompt for input to a large language model of a troubleshooting agent for a computer network;

generating, by the device and using the troubleshooting agent, an intermediate answer by inputting the prompt to the large language model, the intermediate answer relying at least in part on an application programming interface (API) endpoint provided by an online application associated with administration of the computer network;

mapping, by the device, the API endpoint to a view in a user interface provided by the online application, the view including one or more uniform resource locators (URLs) corresponding to user interactions in the user interface;

rebuilding, by the device and based on the user interactions, at least one URL of the one or more URLs to correspond to an access path to the API endpoint by replacing a username in the at least one URL with a placeholder;

identifying, by the device, a hyperlink to the view; and providing, by the device, the hyperlink in conjunction with the intermediate answer for display.

2. The method as in claim 1, wherein the large language model generates the intermediate answer based in part on the view.

3. The method as in claim 1, wherein the intermediate answer includes information about a user or node in the computer network indicated by the prompt.

4. The method as in claim 1, further comprising:

automatically crawling the view in the user interface of the online application.

5. The method as in claim 1, further comprising:

instrumenting the online application to obtain the view in the user interface of the online application.

6. The method as in claim 1, wherein generating the intermediate answer comprises:

using a second large language model to summarize a step that the large language model of the troubleshooting agent performs in response to input of the prompt.

7. The method as in claim 1, wherein the view is associated with an application programming call of the online application.

8. The method as in claim 1, further comprising:

obtaining, by the device, feedback from a user regarding whether the user believed the view provided information relevant to the intermediate answer.

9. The method as in claim 8, further comprising:

suppressing, by the device and based on the feedback, the hyperlink from being provided in conjunction with further intermediate answers by the troubleshooting agent.

10. The method as in claim 1, further comprising:

providing, by the device, a final answer generated by the troubleshooting agent for display.

11. An apparatus, comprising:

one or more network interfaces;

a processor coupled to the one or more network interfaces and configured to execute one or more processes; and a memory configured to store a process that is executable by the processor, the process when executed configured to:

receive a prompt for input to a large language model of a troubleshooting agent for a computer network;

generate, using the troubleshooting agent, an intermediate answer by inputting the prompt to the large language model, the intermediate answer relying at least in part on an application programming interface (API) endpoint provided by an online application associated with administration of the computer network;

map the API endpoint to a view in a user interface provided by the online application, the view including one or more uniform resource locators (URLs) corresponding to user interactions in the user interface;

rebuild, based on the user interactions, at least one URL of the one or more URLs to correspond to an access path to the API endpoint by replacing a username in the at least one URL with a placeholder;

identify a hyperlink to the view; and provide the hyperlink in conjunction with the intermediate answer for display.

12. The apparatus as in claim 11, wherein the process, when executed, is configured to:

automatically crawl the view in the user interface of the online application.

13. The apparatus as in claim 11, wherein the process, when executed, is configured to:

instrument the online application to obtain the view in the user interface of the online application.

14. The apparatus as in claim 11, wherein the apparatus generates the intermediate answer by:
using a second large language model to summarize a step that the large language model of the troubleshooting agent performs in response to input of the prompt.

15. The apparatus as in claim 11, wherein the view is associated with an application programming call of the online application.

16. The apparatus as in claim 11, wherein the process when executed is further configured to:
obtain feedback from a user regarding whether the user believed the view provided information relevant to the intermediate answer.

17. The apparatus as in claim 16, wherein the process when executed is further configured to:
suppress, based on the feedback, the hyperlink from being provided in conjunction with further intermediate answers by the troubleshooting agent.

18. A tangible, non-transitory, computer-readable medium storing program instructions that cause a device to execute a process comprising:
receiving a prompt for input to a large language model of a troubleshooting agent for a computer network;
generating, using the troubleshooting agent, an intermediate answer by inputting the prompt to the large language model, the intermediate answer relying at least in part on an application programming interface (API) endpoint provided by an online application associated with administration of the computer network;
mapping the API endpoint to a view in a user interface provided by the online application, the view including one or more uniform resource locators (URLs) corresponding to user interactions in the user interface;
rebuilding, based on the user interactions, at least one URL of the one or more URLs to correspond to an access path to the API endpoint by replacing a username in the at least one URL with a placeholder;
identifying a hyperlink to the view; and
providing the hyperlink in conjunction with the intermediate answer for display.

19. The method of claim 1, wherein rebuilding, based on the user interactions, at least one URL of the one or more URLs to correspond to an access path to the API endpoint further comprises:
obtaining occurrence data associated with the one or more URLs;
sorting, based at least in part on the occurrence data, the one or more URLs; and
providing, based at least in part on the sorting, the at least one URL.

* * * * *